INVENTOR
Paul G. Weiller
BY Samuel Ostrolenk
ATTORNEY

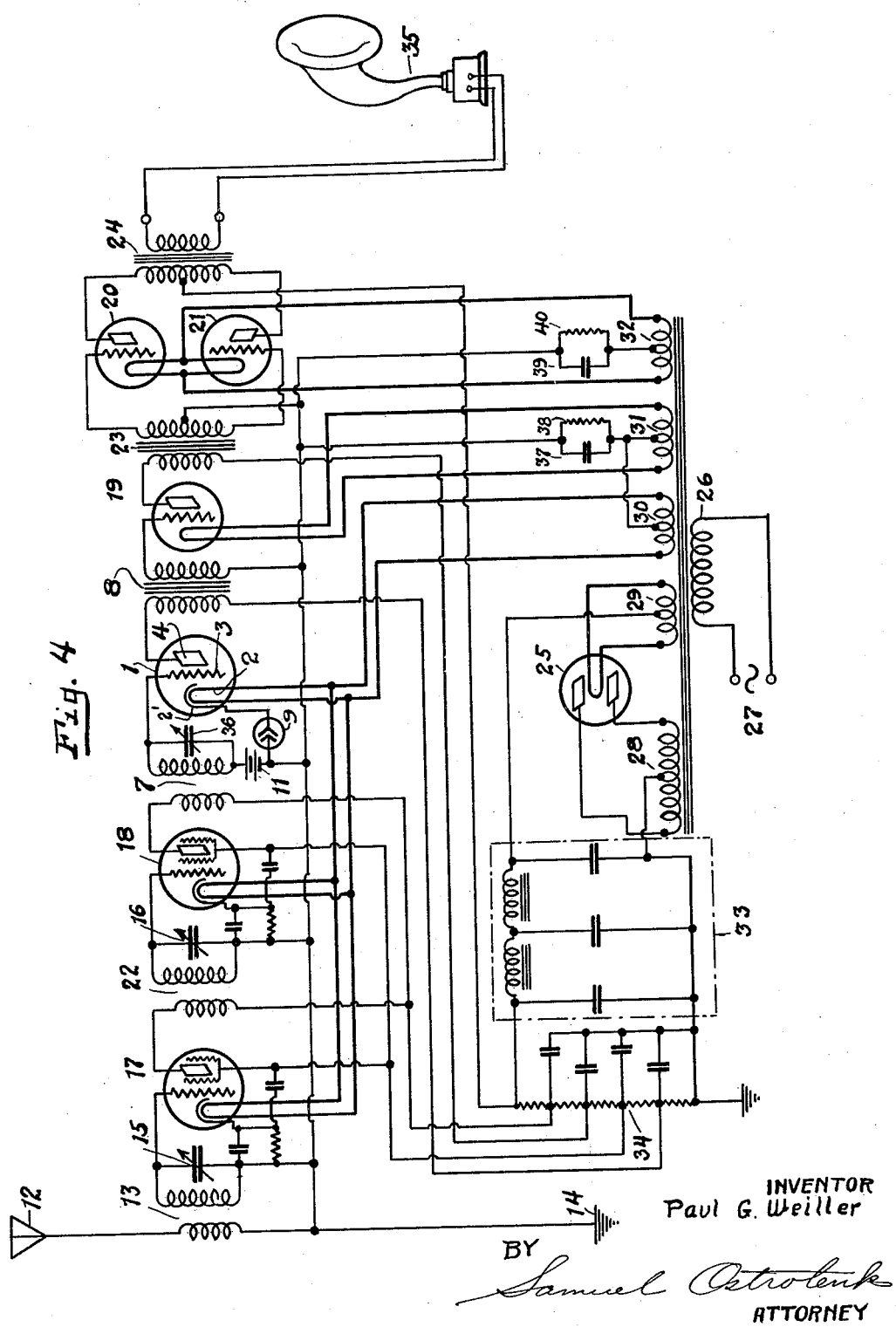

Patented Sept. 20, 1932

1,878,046

UNITED STATES PATENT OFFICE

PAUL G. WEILLER, OF BLOOMFIELD, NEW JERSEY, ASSIGNOR OF FIFTY PER CENT TO RADIO PATENTS CORPORATION, A CORPORATION OF NEW YORK

DETECTOR FOR MODULATED ALTERNATING CURRENTS

Application filed April 3, 1930. Serial No. 441,306.

This invention relates to improvements in high frequency receiving circuits and is more particularly concerned with means for transforming high frequency receiving currents modulated in accordance with a lower frequency signal into currents varying in accordance with said lower frequency. This is known in the art as demodulation or detection of modulated high frequency energy. My invention has special applicability to broadcast receivers and has for its main object a detecting circuit which, in comparison with present circuits, insures increased fidelity of the signal currents received and, at the same time, increases the efficiency of the detecting operation.

A further object of my invention is to provide a detecting or demodulating circuit for radio receivers enabling the efficient use of solid rectifiers, such as those commonly known under the name of crystal detectors, or dry metal rectifiers, or other devices exhibiting a non-linear current voltage characteristic; e. g., a gas filled or vacuum tube.

Heretofore, three means have been used for the detection of radio signals. In the earlier days of radio broadcasting and in wireless telegraphy, so-called crystal detectors were extensively used. Although crystal detectors possess the advantage of passing the reproduced signals carried by a radio wave practically undistorted, their lack of dependability and the need of constant readjustment makes it impossible to utilize such devices in radio receiving sets in which the primary requirement is easy and dependable operation by unskilled persons.

Accordingly, two other methods of rectification or detection, utilizing the properties of vacuum tubes, are now commonly used in radio receiving sets. One method is known as grid leak detector and the other method, which has recently come into more extensive use, is known as the anode rectification system. Both systems utilize certain properties of the characteristic curves of vacuum tubes, but the efficiency of rectification, as well as the fidelity of the reproduced signals, leave much to be desired, as is well known to any one acquainted with the art.

In recent years, it has become the general practice to operate radio receivers directly from alternating current lighting mains. Such radio receivers, of course, require rectifiers and filtering devices to change the alternating current supply into direct current and smooth out the fluctuations. It has been found by experience that it is comparatively easy to eliminate the hum in amplifier stages, but very difficult to avoid introducing at least a small hum in the present type of detector. Accordingly, if the detector is followed by several stages of audio frequency amplifiers, the hum of the detector is amplified along with the signal and results in considerable disturbance and hum in the sound issuing from the loud speaker. It has, therefore, become the practice to amplify as much as possible on the radio frequency stages and convey relatively strong radio frequency signal to the detector and, correspondingly, reduce the degree of amplification in audio stages. As a result of amplifying before the detector, the energy which the detector must handle and convert from modulated radio frequency to audio frequency becomes quite high and distortion is quite appreciable. In fact, the introduction of the so-called anode rectification system is an attempt to avoid such distortion. The efficiency of such a dector is, however, quite low, as it is capable of delivering only a small amount of rectified energy.

An object of my invention, therefore, is to improve the efficiency of such an anode rectification system, so that, in spite of handling of large amount of energy, the rectifier system will be relatively efficient and, at the same time, avoid distortion.

According to my invention, use is made of rectifying devices; that is, devices having a non-linear current voltage characteristic, in combination with an ordinary vacuum tube, as will be described in detail. Such rectifying devices may be crystal detectors, or dry metal rectifiers, or any other type of device having the above non-linear characteristic The following description is given in reference to the accompanying drawings, showing, by way of example, some embodiments of my invention. I wish it to be understood, however, that the circuits illustrated in the drawings should be taken as illustrative only of the general principle underlying my invention, as broadly defined by the scope of the appended claims.

Figure 4 is a diagram of complete broadcast receiving circuit, operated from alternating current mains and incorporating the detector in accordance with my invention.

Figure 1:
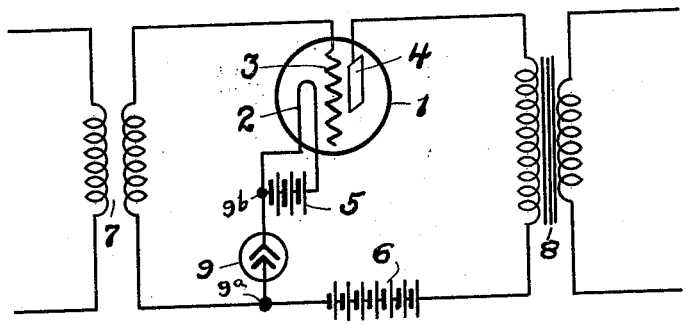
Figure 1 shows a detector for modulated oscillations embodying the principle of my invention.

Referring more particularly to the circuit of Figure 1, I have shown a vacuum tube 1 of the usual type, including a filamentary cathode 2, an anode 4 and a control or grid electrode 3 placed between the cathode and anode. A heating battery 5 is connected across the filament to supply filament current thereto. An input high frequency transformer 7 is connected to the cathode and grid of the tube and serves to apply the high frequency modulated voltage of the tube. The primary of this input transformer may receive the energy from any source, for instance, in the case of radio broadcast receiver, from the receiving antenna, or, preferably, from high frequency amplifier stages connected between the antenna and the detector system. An anode battery 6 and a low frequency transformer 8 are included in the circuit between the anode 4 and the filament. The transformer 8 serves to transfer the low frequency signals derived from the modulated signal by means of rectification to a further stage of amplification, or directly to a loud speaking device.

According to my invention, I locate a device 9, exhibiting a non-linear current voltage characteristic, in the common return lead from the grid and anode circuit to the cathode. This device may, for instance, be a crystal detector, preferably of the carborundum type, or a dry metal rectifier, such as is well known in the art and consisting of two or more coated metal plates arranged in intimate contact with each other and each having a different electron affinity resulting in rectifying properties, or else a vacuum tube or a glow discharge tube may be used.

By non-linear current voltage characteristic, I refer to the property of such devices, which is most clearly illustrated by plotting on coordinate paper the currents passed at different voltages through this device. The resulting curve will be found to have one or more bends; that is, it will not be a straight line. Hence, the name non-linear characteristic. In other words, such device will have the property of changing at least at one point the value of its resistance and, in general, this point is found to lie close to the zero voltage. This property is utilized in rectifiers, since the high resistance opposes the flow of current in one direction, while the low resistance permits the current to flow in the opposite direction. In many types of rectifiers this change in resistance or bend in the voltage current characteristic occurs at a value of current amounting to several milliamperes and, in carrying out my invention, I find it preferable to apply such a rectifier in such a manner that the plate current of the tube corresponds to the value of the current through the rectifier, at which this change of resistance occurs.

It is evident, however, that if the resistance gradually changes over a certain range, I can apply any current to the rectifier, at which there is an appreciable change in resistance.

It has already been proposed to place a rectifying device, such as a crystal, in the input circuit or in the output circuit of a vacuum tube connected in the usual manner. However, this does not give the desired results and circuits of this kind have never been successfully introduced into practice. The reason for this lies in the fact that a crystal or metal rectifier, if placed in the high frequency circuit, absorbs a large amount of energy, on account of its high resistance. Furthermore, by placing the crystal or metal rectifier in either the grid or the anode circuit, the value of its resistance is small, relative to the internal resistance of the tube and, hence, any changes in the value of resistance of said rectifier has only a small influence on the total current flowing in the circuit.

The above disadvantages are overcome by my novel circuit, as shown, for instance, in Figure 1, by placing the crystal or the metal rectifier 9 in the common return lead of the grid and the anode circuit. Thus, a comparatively strong anode current flowing through the rectifier gives a voltage drop which will vary in proportion to the changes of resistance, as well as in proportion to the changes in current and these variations of voltage drop are directly applied to the grid circuit. The operation of this circuit may further be explained as follows, by referring to the diagrams of Figure 2.

Figure 2:
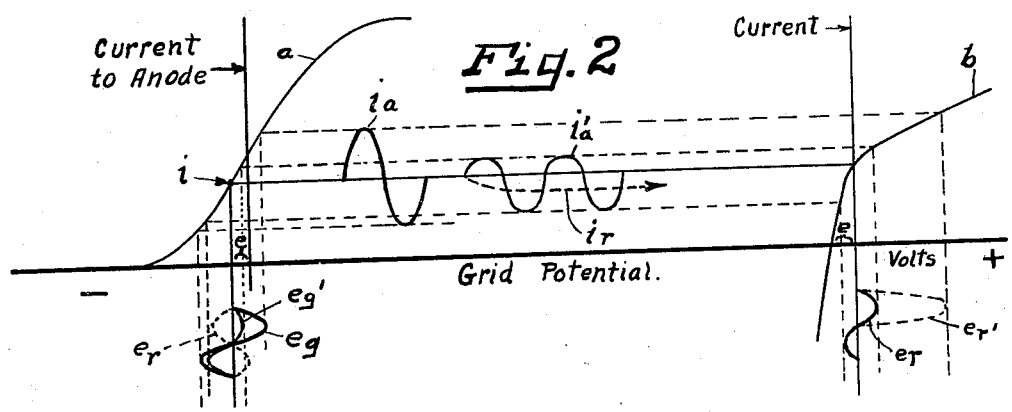
Figure 2 represents a number of theoretical operation curves, explaining the physical phenomena taking place in the circuits according to my invention.

I have shown in Figure 2, to the left, the usual type of three-electrode tube characteristic a, in which the grid potential is plotted as an abscissa and the current to the anode as an ordinate. To the right, I have plotted the characteristic of the rectifier used in conjunction with this tube, so that the curve $b$ represents the variation of the voltage as plotted on the abscissa, with the changes in current as plotted on the ordinates to the same scale as the current to the anode on the left. Thus, for a normal plate current, indicated as $i$, the drop of potential through the rectifier is represented by abscissa $e$, which is exactly the same as the negative bias $e$ on the curve $a$ to the left, which is in accordance with the diagram of Figure 1, since the potential of point $9a$ of the rectifier 9 is below the potential of point $9b$, due to the flow of the anode current through said rectifier.

Heretofore, impedance devices have been connected in the part of the circuit corresponding to my device 9. I have found that my arrangement, utilizing a resistance with non-linear voltage current characteristic in this circuit, results in the desirable effects described below.

Supposing that a signal voltage, represented by $e_g$, is applied to the grid of the tube. This would normally result in a current as represented by $i_a$ and such a current flowing through the rectifier 9 would result in changes of the potential at the terminals $9a$ and $9b$, corresponding to curve $e_r'$. The output current, however, cannot actually follow the curve $i_a$ due to the fact that, as the output current increases, the grid bias increases due to the increased drop through the rectifier 9. Accordingly, the actual current in the output circuit takes the form shown $i'_a$ at which values the grid bias produced by the rectifier 9, when subtracted from the input potential through the transformer 7, gives the desired plate current, which is the curve $i'_a$. With current as shown in $i'_a$ flowing, the potential $l_r$ applied to the grid circuit, as shown to the left, will be subtracted from the value of $e_g$, resulting in a curve $e_g'$, which exactly corresponds to the variation of current, in accordance with $i_a'$. It will be seen that this first half cycle of $i_a'$ is of relatively smaller amplitude than the second half cycle, since the voltage $e_r$ through the rectifier 9, resulting from this second half cycle is less and, therefore, less is subtracted from the corresponding value of $e_g$, as shown on the left; that is, the voltage $e_g'$, which is the actual voltage at the grid, is asymmetrical and so is the resulting current $i_a'$. Such an asymmetric current has a reduced average value, as is indicated by the dotted line $i_r$, which is the well known rectification phenomenon.

It is evident, of course, that this type of operation of rectifier is made possible by insertion of the rectifier in the common return from the grid and the plate circuit. Thus, the plate current flowing through this rectifier results in a potential drop, which is applied to the grid circuit to secure the necessary changes in biasing. It is also quite evident that a fixed resistance or inductance could not accomplish the same result as a rectifier, since the changes in biasing due to an increase or a decrease of current will be the same value and, thus, while reducing the variation of grid potential as applied to the input circuit, does not produce any unilateral distortion, such as is secured from a rectifier and does not result in increased rectification.

I have shown the vacuum tube operating on the straight line part of its characteristic, but this, of course, is not necessary, although it does insure the clearest reproduction and the least possibility of distortion. On the other hand, it may sometimes be advisable to operate the tube at a point near its lower or upper bend, in which case the current $i_a$ itself would not be a sinusoidal current, but will undergo a certain amount of rectification, even before the effect of the rectifier 9 is taken into account. Such an operation near the bend of the vacuum tube characteristic may be desirable in certain cases where the efficiency of rectification is of more importance than the extreme faithfulness of reproduction. This is present, for instance, in telegraphy, whereas, in broadcasting, the main stress will be laid on the fidelity of signal reproduction. In certain types of rectifiers, instead of having the bend in voltage current characteristics, as shown in Figure 2, this bend may have the opposite sense. In other words, Figure 2 shows a rectifier where, for an increase in operating current, the resistance is high, while for a decrease of operating current, the resistance is low. Rectifiers are known where the bend occurs at such a point that an increase in current results in the decrease of resistance, while a decrease in current results in an increase of resistance. It is, of course, evident that this type of rectifier can be utilized in exactly the same manner, although the resultant rectification will be different. Instead of $i_r$ being shown by a reduction in the average current, it will become an increase in the average current.

Figure 3:
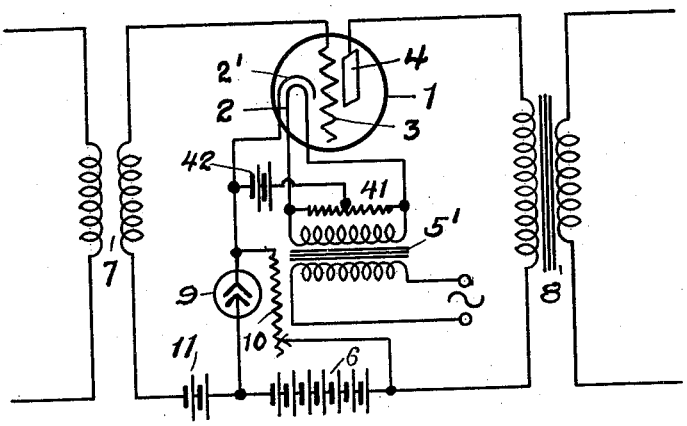
Figure 3 is a circuit similar to Figure 1, showing, however, an indirectly heated vacuum tube and further modifications which practical experience has shown to be desirable.

In Figure 3, I have shown my invention applied to a so-called heated cathode detector tube and have also incorporated in it such improvements as I have found by experiments to be desirable under certain circumstances. Similar characters for corresponding items in Figure 1 are used. It will be noted that, instead of filamentary cathode 2, I have a heated cathode 2' surrounding the filamentary heater 2, to which alternating current is supplied from the transformer 5'. This transformer may be bridged, as shown by a resistor 41, the center point of which is connected through the proper source of potential, which is shown as a battery 42 to the cathode 2', so as to prevent leakage current from heater to cathode and consequent increase in hum. I have also shown an adjustable resistor 10 shunted across the rectifier 9 and the source of anode potential 6. The object of this resistor may be explained as follows:—

A rectifier may possess just the desirable quality of a sharp bend in the current voltage characteristic, but the value of current at this bend may be different from the value of current through the anode circuit. To overcome this difficulty, I supply a resistor 10 connected, as shown, to the positive end of the anode supply to supply the extra current, or to the negative end (not shown), so as to shunt off a slight excess of current from the rectifier. By this means, I can adjust the actual current through the rectifier to be exactly the amount desired for the best rectifying properties.

A grid biasing battery 11 may be provided for the purpose of adjusting the proper grid potential, either to a point on the straight portion of the tube characteristic, or to a point at the bent portion, as may be desired.

Referring to Figure 4, I have illustrated a complete radio receiving set, as commonly used for direct operation from an alternating current house circuit, with the novel detector circuit of my invention incorporated therein. The modulated high frequency energy, such as a broadcasting wave, is received by an antenna ground system, comprising the antenna 12, ground connection 14 and the input high frequency transformer 13. The secondary circuit of transformer 13 includes a tuning condenser 15 and is connected to the input of a high frequency amplifying tube 17 of the usual screen grid type. I have shown a further high frequency amplification screen grid stage, comprising coupling transformer 22, tuning condenser 16 and screen grid tube 18, similar to the first stage of amplification following the antenna circuit. Further stages of amplification may be supplied if necessary. The amplified high frequency energy is applied to the detector circuit through the transformer 7 and tuning condenser 36, in the same manner as described in connection with Figure 3, the same numerals having been used for illustration. Low frequency currents obtained after rectification are further amplified by a low frequency stage, comprising amplifying tube 19 and a final push-pull power amplifying stage, comprising the tubes 20 and 21 and push-pull input transformer 23 and output transformer 24. The output of the latter transformer is applied to a loud speaking device 35. It is, of course, evident that I may use other types of audio frequency amplifiers and, in particular, resistance coupled audio frequency amplifiers, either direct or with condenser coupling, which have been found to be very satisfactory for this purpose. The alternating current, as supplied at 27, is passed through the primary of a transformer 26, which, in the usual manner, carries a number of secondary circuits for obtaining the necessary voltages to be used for the different purposes. I have shown the tubes 17, 18 and the detector tube 1 to be of the heater type, in which the cathode member is an oxide coated cylinder heated by radiation from the filament proper, whereas the audio frequency tubes 19, 20 and 21 are shown to be of the filament type where the hot oxide coated filament is the cathode and the source of the electronic supply. The secondary 30 of the supply transformer 26 serves to provide heating current for the screen grid tubes 17 and 18 and the detector tube 1. The secondary 31 furnishes the heating current for the amplifying tube 19 and the secondary 32 serves to supply the proper heating current for the push-pull tubes 20 and 21. Secondary 29 of the supply transformer 26 serves to heat the filament of a full wave rectifier 25 and the secondary 28 supplies the proper voltage for the rectifier, which, after rectification and passing through a usual filter 33, is utilized to supply the different amounts of anode voltage and biasing voltages of the vacuum tubes, for which purpose a potentiometer 34 is provided. The bias for the low frequency amplifier tubes 19, 20 and 21 may also be secured from the arrangements connected to transformers 31 and 32, as shown, consisting of a small condenser 37 with a by-pass resistance 38 and small condenser 39 with a by-pass resistor 40, respectively. The arrangement 37—38 serves, at the same time, to supply the voltage between the heater 2 and cathode 2' in all of the heated cathode tubes.

It is, of course, evident that my invention can be applied to any radio broadcast set, or to any device in which a modulated signal of one frequency is changed to another frequency, in accordance with the modulations. Figure 4 is merely intended as an illustration of a practical application of my system.

Having described my invention, what I claim is:—

1. In a detector arrangement for demodulating alternating current modulated signals having a demodulating detector, an input and output circuit for said detector, and means common to said two circuits for introducing a non-linear current voltage characteristic.

2. In a detector circuit for modulated carrier currents, comprising a space discharge device, having main electrodes and control electrode, an input circuit associated with said control electrode, an output circuit associated with said main electrodes and means common to said two circuits with non-linear current voltage characteristic.

3. In a detector circuit for modulated carrier currents, comprising a space discharge device, having main electrodes and control electrode, an input circuit associated with said control electrode, an output circuit associated with said main electrodes, a common return lead of said input circuit and said output circuit and a dry metal rectifier included in said return lead.

4. In a detector circuit for modulated carrier currents, comprising a vacuum tube having cathode, grid and anode electrodes, an input circuit associated with said grid and cathode, an output circuit associated with said anode and cathode, a common return connection to said cathode from said input and output circuit and a device with non-linear current voltage characteristic in said common return.

5. In a detector circuit for modulated carrier currents, comprising a space discharge device, having main electrodes and control electrode, an input circuit associated with said control electrode, an output circuit associated with said main electrodes, a common return lead of said input circuit and said output circuit and a rectifier device included in said return lead.

6. In a detector circuit for modulated carrier currents, comprising a space discharge device, having main electrodes and control electrode, an output circuit associated with said control electrode, an output circuit associated with said main electrodes, a common return lead of said input circuit and said output circuit and a crystal rectifier included in said return lead.

7. In a detector circuit for modulated carrier currents, comprising a vacuum tube, having cathode, grid and anode electrodes, an input circuit associated with said grid and cathode, an output circuit associated with said anode and cathode, a common return lead from said input and said output circuits to said cathode, a rectifier device in said common return lead and means to adjust the grid potential and biasing means for said grid electrode.

8. In a detector circuit for modulated carrier currents, comprising a space discharge device, having main electrodes and control electrode, input circuit associated with said control electrode, an output circuit associated with said main electrodes, a common return of said input circuit and said output circuit, a device possessing non-linear current voltage characteristic included in said return lead and means shunting said device for adjusting the current value through said device.

9. In a detector circuit for modulated carrier currents, comprising a space discharge device, having main electrodes and control electrode, input circuit associated with said control electrode, an output circuit associated with said main electrodes, a common return of said input circuit and said output circuit, a device possessing non-linear current voltage characteristic included in said return lead and a rheostat for adjusting the current value through said device.

10. A method of detecting modulated alternating currents by means of a space discharge device, in combination with a rectifier, consisting of passing the output of said space discharge device through said rectifier and utilizing the voltage drop due to said current for further control of said space discharge device.

In testimony whereof I affix my signature.

PAUL G. WEILLER.